United States Patent
Karube et al.

(10) Patent No.: US 7,006,310 B2
(45) Date of Patent: Feb. 28, 2006

(54) COLOR PROJECTION TYPE DISPLAY APPARATUS REUSING INCIDENT LIGHT

(75) Inventors: Hiroo Karube, Tokyo (JP); Mikio Sakamoto, Tokyo (JP)

(73) Assignee: Nec Viewtechnology, Inc., Tokyo (JP)

( * ) Notice: Subject to any disclaimer, the term of this patent is extended or adjusted under 35 U.S.C. 154(b) by 0 days.

(21) Appl. No.: 10/918,097

(22) Filed: Aug. 13, 2004

(65) Prior Publication Data

US 2005/0046981 A1   Mar. 3, 2005

(30) Foreign Application Priority Data

Aug. 25, 2003 (JP) ............................. 2003-299438

(51) Int. Cl.
*G02B 5/22* (2006.01)
(52) U.S. Cl. .................... 359/891; 359/892; 348/743; 356/418; 353/84; 362/293
(58) Field of Classification Search ............... 359/885, 359/891–892; 348/743; 356/418; 353/84; 362/293

See application file for complete search history.

(56) References Cited

U.S. PATENT DOCUMENTS

| 6,334,685 B1 * | 1/2002 | Slobodin | 353/31 |
| 6,504,598 B1 * | 1/2003 | Kitano | 355/71 |
| 6,812,979 B1 * | 11/2004 | Um | 349/106 |
| 6,824,275 B1 * | 11/2004 | Penn | 353/81 |
| 2001/0008470 A1 * | 7/2001 | Dewald | 359/850 |

FOREIGN PATENT DOCUMENTS

| JP | 08-051633 | 2/1996 |
| JP | 10-078550 | 3/1998 |
| JP | 11-264953 | 9/1999 |
| JP | 2000-147696 | 5/2000 |
| JP | 2001-228535 | 8/2001 |
| JP | 2001-264689 | 9/2001 |
| JP | 2001-356286 | 12/2001 |
| JP | 2003-015217 | 1/2003 |

* cited by examiner

*Primary Examiner*—Leonidas Boutsikaris
(74) *Attorney, Agent, or Firm*—Scully, Scott, Murphy & Presser (57) ABSTRACT

A color projection type display apparatus having a light source, a color wheel driven to rotate and having a plurality of types of color filters, different in characteristics from one another, disposed on the same surface thereof to transmit a particular component of light from the light source and to reflect the remaining components, a reflector for reflecting a component of light impinging on the color wheel and reflected by one type of the color filters to again direct the component back to another type of color filters, an image display device having a plurality of areas each irradiated with particular component of light transmitted by the color filters, respectively, to display an image, and a projection lens for projecting the image displayed by the image display device onto a screen.

10 Claims, 13 Drawing Sheets

COLOR PROJECTION TYPE DISPLAY APPARATUS REUSING INCIDENT LIGHT

BACKGROUND OF THE INVENTION

1. Field of the Invention

The present invention relates to a time-division color projection type display apparatus.

2. Description of the Related Art

Figure 1:
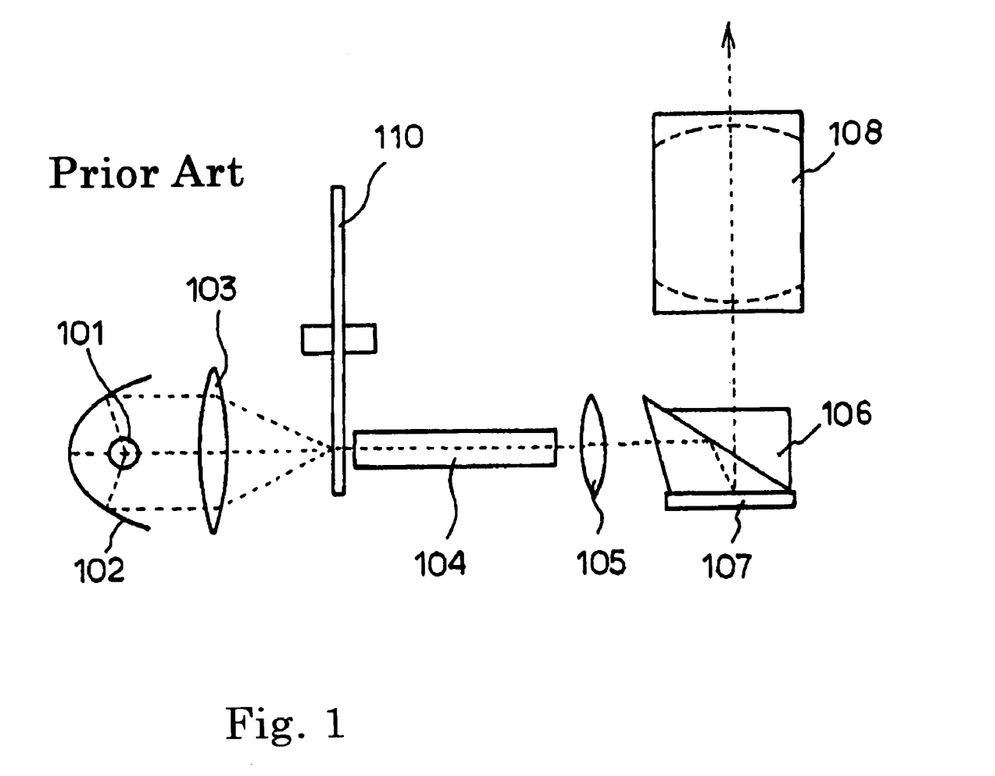
FIG. 1 is a schematic diagram illustrating the configuration of a prior art FSC-based projector.

Conventionally, there has been proposed a time-division color projection type display apparatus which is basically configured to project images of a plurality of different colored light rays including a plurality of different colors, for example, red, green, blue, or white in a time division mode to display a color image for display. For example, Japanese Patent Laid-Open Publication No. 78550/98 discloses a DMD projector which utilizes an image display device that comprises a digital mirror device (hereinafter called "DMD") having several hundreds of thousands of mirror elements, each of which can be controlled in inclination, on a semiconductor memory cell, and controls the inclination of each mirror element to control a reflecting condition to form an image. As illustrated in FIG. 1, in this DMD projector, light emitted from light source 101 is reflected by reflecting mirror 102, and converged by condenser lens 103 to a point on color wheel 110 which is provided with red (R), green (G), and blue (B) filters (hereinafter sometimes called "RGB filters") in a spiral pattern to selectively allows each of red, green blue color to pass therethrough. The light which has passed through color wheel 110 is uniformalized by light waveguide (hereinafter called "integrator rod") 104, transformed into collimated light flux by relay lens 105, and irradiated to DMD 107 through total internal reflection prism (hereinafter called "TIR prism") 106. The light irradiated to DMD 107 is reflected therefrom in accordance with an image signal applied to DMD 107. The reflected light, i.e., image light which is modulated light, again passes through TIR prism 106, and is projected onto a screen through a projection lens 108 which has a zooming function.

Figure 2:
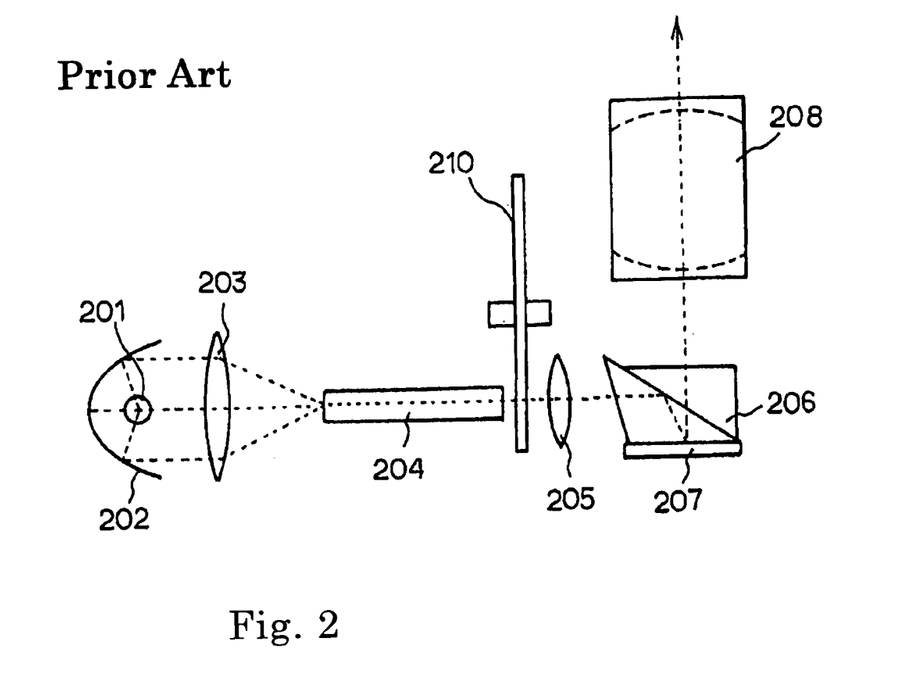
FIG. 2 is a schematic diagram illustrating the configuration of a prior art SCR-based projector.

Such a DMD projector is called a "Field Sequential Color system" (hereinafter called "FSC system"). There is a Sequential Color Recapturer system (hereinafter called "SCR system") which is capable of improving the light utilization efficiency by approximately 40% higher than the FSC system. As illustrated in FIG. 2, the SCR system is provided with an integrator rod having both ends that serve as quasi reflection planes. Light emitted from light source 201 is reflected by reflecting mirror 202, and is focussed on an incident end face of integrator rod 204 by condenser lens 203. The light traveling through integrator rod 204 exits from an emission end face, and impinges on color wheel 210. Part of the light incident on color wheel 210 at certain wavelength is transformed into collimated light flux by relay lens 205, and is irradiated to DMD panel 207 through TIR prism 206. However, another part of the light is reflected by color wheel 210, and again impinges on integrator rod 204 from the emission end face. The light, which has impinged again, travels through integrator rod 204 up to the incident end face, is reflected again by the incident end face, emitted from the emission end face of integrator rod 204 together with the light from light source 201, and again impinges on color wheel 210. Subsequently, similar actions are repeated. In this way, the light is reflected between the incident end face of integrator rod 204 and color wheel 210 multiple times to enhance the light intensity. In addition, the resulting illumination light, which has a uniform brightness distribution, is irradiated to DMD 207 through TIR prism 206 and modulated as mentioned above. The light (projected light) modulated by DMD 207, which represents an image, is projected through TIR prism 206 and projection lens 208, thereby displaying the image on a screen or the like.

The SCR system has limitations in increasing the light utilization efficiency through repetitive reflections of light in integrator rod 204 due to a low reflection efficiency on the incident end face of integrator rod 204, and is expected to provide merely about 40% of improvement as compared with the FSC system as described above. To surpass the SCR system, there has been proposed techniques for improving the light utilization efficiency by modulating colored light of one color which is transmitted by an RGB filter of a color wheel and colored light of another color which is reflected by the RGB filter, respectively and projecting the resulting light. Japanese Patent Laid-Open Publication No. 228535/2001 and Japanese Patent Laid-Open Publication No. 264953/99 have proposed techniques for decomposing light reflected by a color wheel and light transmitted by the color wheel as different colored light components, applying each of the decomposed colored light components to a respective separate image display device to display an image, and superimposing the images of the respective colors within a projector or on a screen to project a color image. However, these techniques require a number of image display devices as much as the number of decomposed colored light components, and also require an optical system for synthesizing images of respective colors, thus suffering from a problem of a complicated structure.

On the other hand, Japanese Patent Laid-Open Publication No. 264689/2001 has proposed techniques for spatially decomposing light from a light source into RGB colored light components in a color filter, dividing a display surface of a single image display device into three areas, sequentially irradiating each of the divided areas with decomposed RGB colored light components to display images in the respective divided areas in time division. Japanese Patent Laid-Open Publication No. 264689/2001 also discloses techniques for increasing the light utilization efficiency by returning reflected light, which is provided when each colored light is transmitted by the color filter for separation, toward a light source to reuse the reflected light.

Japanese Patent Laid-Open Publication No. 264689/2001 is advantageous over Japanese Patent Laid-Open Publication No. 228535/2001 and Japanese Patent Laid-Open Publication No. 264953/99 in the ability to simplify the structure because RGB colored light components are sequentially irradiated to each of the divided areas on the image display device. However, Japanese Patent Laid-Open Publication No. 264689/2001 simply returns reflected light provided during the separation toward the light source, and since the reflected colored light is again reflected by the same color filter, it is difficult to increase the transmission efficiency of each colored light at the color filter. Consequently, Japanese Patent Laid-Open Publication No. 264689/2001 actually provides the light utilization efficiency substantially equal to that of the SCR system, and encounters difficulties in realizing an expected light utilization efficiency three times higher than that of the FSC system.

SUMMARY OF THE INVENTION

It is an object of the present invention to provide a color projection type display apparatus based on a color separation method, which improves the light utilization efficiency without complicating the structure.

The color projection type display apparatus of the present invention includes a light source, a color wheel driven to rotate and having a plurality of types of color filters, different in characteristics from one another, disposed on a surface thereof to transmit a particular component of light from the light source and to reflect the remaining components, a reflector for reflecting a component of light impinging on the color wheel and reflected by one type of the color filters to again direct the component back to another type of color filters, an image display device having a plurality of areas each irradiated with particular component of light transmitted by the color filters, respectively, to display an image, and a projection lens for projecting the image displayed by the image display device onto a screen.

Specifically, in the color projection type display apparatus of the present invention, each of the color filters is oriented at an angle of 45 degrees to the optical axis of light impinging thereon, and the reflector has a reflecting surface in parallel with the color wheel with a predetermined spacing intervening therebetween on the light incident side. The color projection type display apparatus also includes light uniformalizing means between the light source and color wheel or between the color wheel and image display device for uniformalizing light impinging thereon and emitting the uniformalized light. In the latter case, the light uniformalizing means is preferably divided so as to uniformalize a plurality of colored light components separated by the color wheel independently of one another.

As appreciated, the color projection type display apparatus of the present invention passes light from the light source through one of the color filters on the color wheel, and directs the light reflected by the color filter again to other color filters, so that light reflected by a color filter can be transmitted again by another color filter as another light component and utilized for displaying an image. Thus, only by providing a single reflector and a single image display device, the resulting image display device can have a light utilization efficiency three times as high as that of the FSC system, and twice or more as high as that of the SCR system.

The above and other objects, features and advantages of the present invention will become apparent from the following description with reference to the accompanying drawings which illustrate examples of the present invention.

BRIEF DESCRIPTION OF THE DRAWINGS

FIGS. 5A to 7B are explanatory diagrams illustrating light transmitting actions provided by the color wheel;

DESCRIPTION OF THE PREFERRED EMBODIMENTS

In a color projection type display apparatus of the present invention, a color wheel comprises a first to an N-th (N is a natural number) filters. Part of incident light is transmitted by the first filter to provide first transmitted light, while the remaining light is reflected by the first filter to provide first reflected light. The first reflected light is incident on a second filter after it has been reflected by a reflector, and part of the light incident on the second filter is transmitted by the second filter to provide second transmitted light, while the remaining light is reflected by the second filter to provide second reflected light. The second reflected light is incident on a third filter after it has been reflected by the reflector, and part of the light incident on the third filter is transmitted by the third filter to provide third transmitted light. The foregoing actions are repeated a number of times equal to the number N of filters to provide first to N-th transmitted light which is irradiated to an image display device.

In the present invention, the following configurations are preferable.

(1) A reflector is mounted to a color wheel case which houses and supports a color wheel.

(2) An optical element is provided for irradiating an image display device with a plurality of separated light beams emitted from the color wheel. An area of the color filter irradiated with light from a light uniformalizing means is within the focus depth of a back focus of the optical element.

(3) The light uniformalizing means is implemented by a light tunnel or a rod lens, wherein one side of the light uniformalizing means closer to the color wheel has a length longer than that of the opposite side.

(4) A display image area irradiated with light reflected by the reflector a larger number of times displays the colored light for a longer time.

Figure 3:
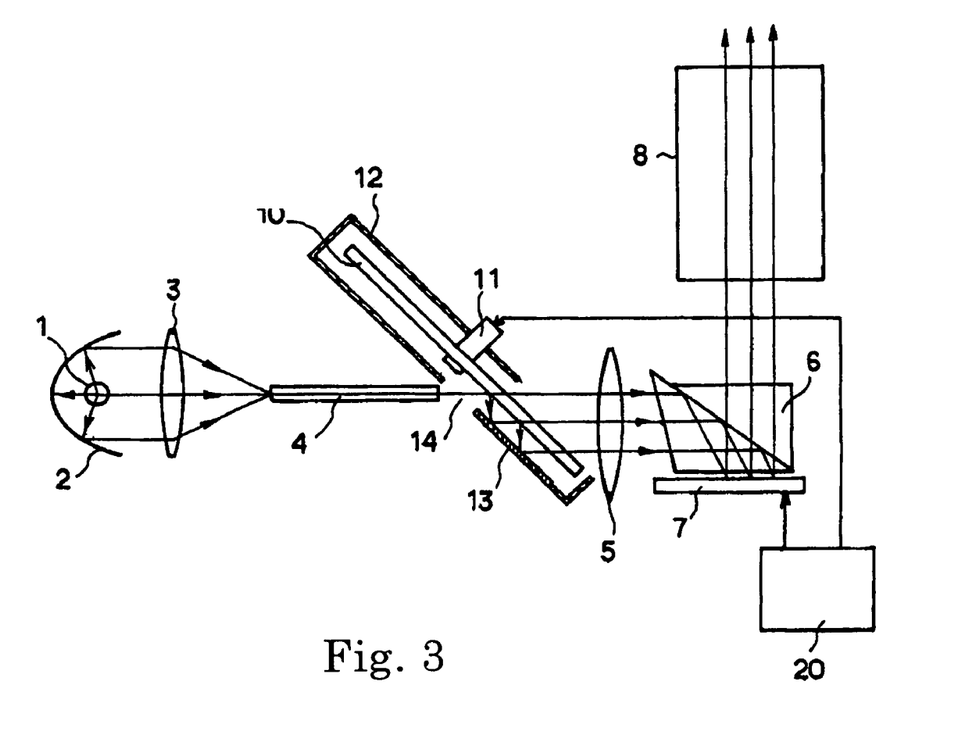
FIG. 3 is a schematic diagram illustrating the configuration of a color projection type display apparatus according to a first embodiment of the present invention.

Next, embodiments of the present invention will be described with reference to the accompanying drawings. FIG. 3 is a schematic diagram illustrating the configuration of a first embodiment in which the present invention is applied to a DMD projector. While light emitted from light source 1 is reflected by reflecting mirror 2 in the shape of spheroid, and is converged on an incident end face of integrator rod 4 by condenser lens 3. The light, which travels through integrator rod 4 and exits from an emission end face thereof, impinges on color wheel 10. Color wheel 10 is housed in color wheel case 12, and is driven by motor 11 to rotate within the plane of color wheel 10 at a high speed. The rotation plane is tilted to form an angle of 45 degrees to the optical axis of the light emitted from integrator rod 4.

Figure 4A:
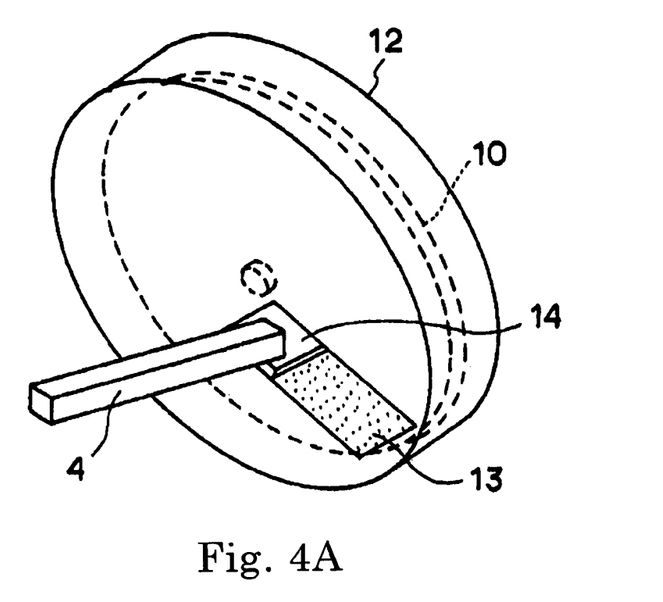
FIG. 4A is a perspective view of a color wheel.
Figure 4B:
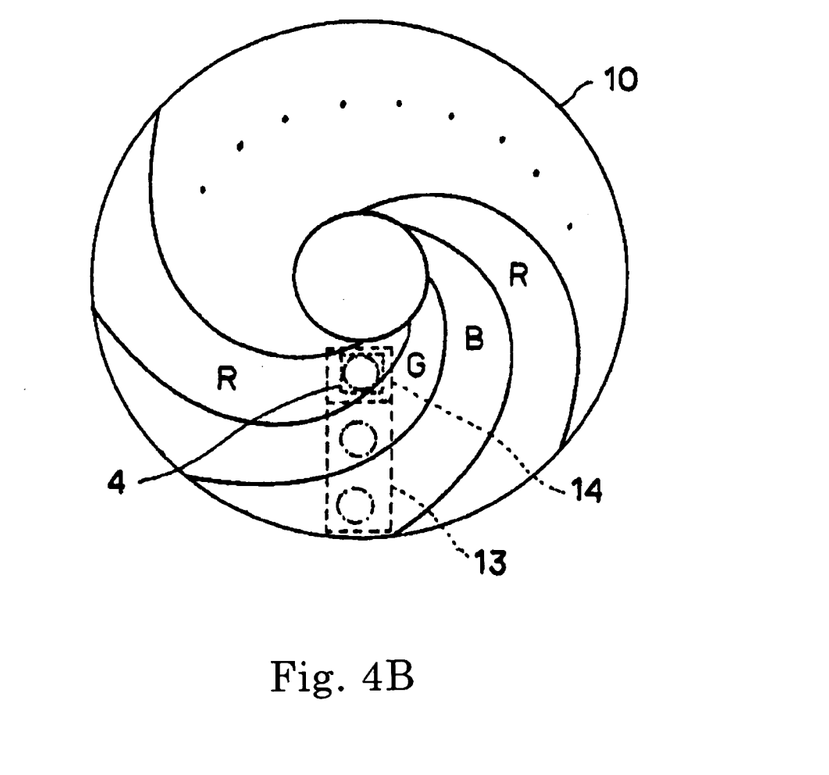
FIG. 4B is a lateral view of the color wheel.

FIG. 4A is a diagram illustrating the outer appearance of color wheel 10, and FIG. 4B is a lateral view of color wheel 10 taken from the opposite side from light source 1, wherein transmission filters of R, G, B colors, i.e., RGB filters are repeatedly disposed on the same disk in a spiral pattern. In this way, while the respective R, G, B transmission filters are arranged side by side in the radial direction, the respective R, G, B transmission filters differ in the order in which they are arranged in the radial direction at different locations in the circumferential direction of color wheel 10. Also, on the light source side of color wheel 10, reflecting mirror 13 is disposed at a position adjacent to the emission end face of integrator rod 4, spaced by a certain distance from color wheel 10. Reflecting mirror is oriented in a radial direction of color wheel 10 and in parallel with color wheel 10. Reflecting mirror 13 is mounted in part of window 14 formed through color wheel case 12 for transmitting light. By mounting reflecting mirror 13 to color wheel case 12, it is possible to improve the dimensional accuracy of the gap between color wheel 10 and reflecting mirror 13 and the accuracy of the parallelism between the two components. This is required for setting a correct light path for each colored light after decomposition of colors by color wheel 10 (adjustment of optical axis), as will be later described.

On the other hand, on the side of color wheel opposite from light source 1, relay lens 5 and TIR prism 6 are disposed such that they oppose reflecting mirror 13, and TIR prism 6 is provided with DMD 7 as an image display device for modulating light to produce an image. Colored light which has been transmitted by color wheel 10 is transformed into collimated light flux by relay lens 5, totally reflected within TIR prism 6, and irradiated to DMD 7. Each colored light irradiated to DMD 7 is selectively reflected on DMD 7 for modulation, passes through TIR prism 6, and is projected by projection lens 8 onto a screen, disposed outside of the figure, as a display image. The operation of DMD 7 is controlled for performing a required modulation in synchronization with the rotation of color wheel 10 in accordance with an image signal applied to control circuit 20.

Figure 5A:
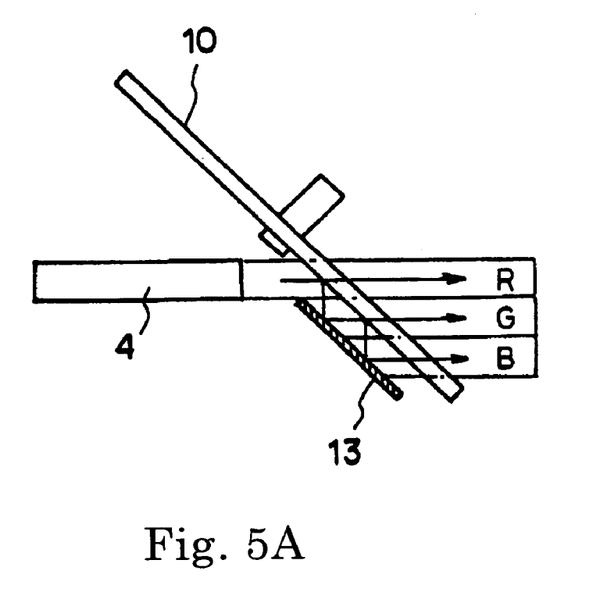
Figure 5B:
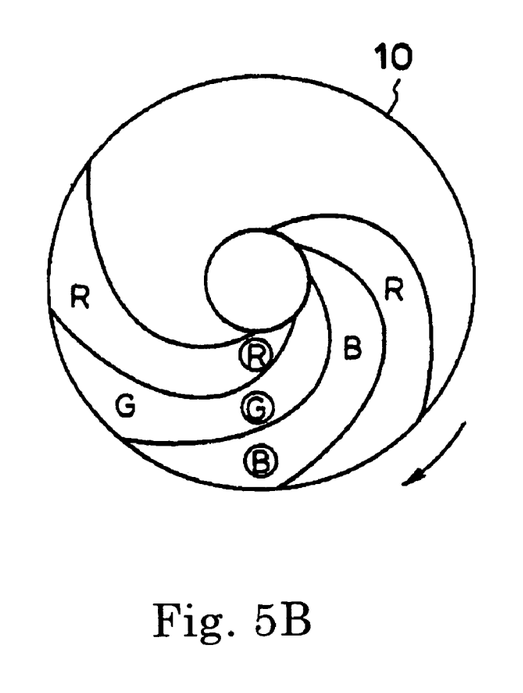
Figure 6A:
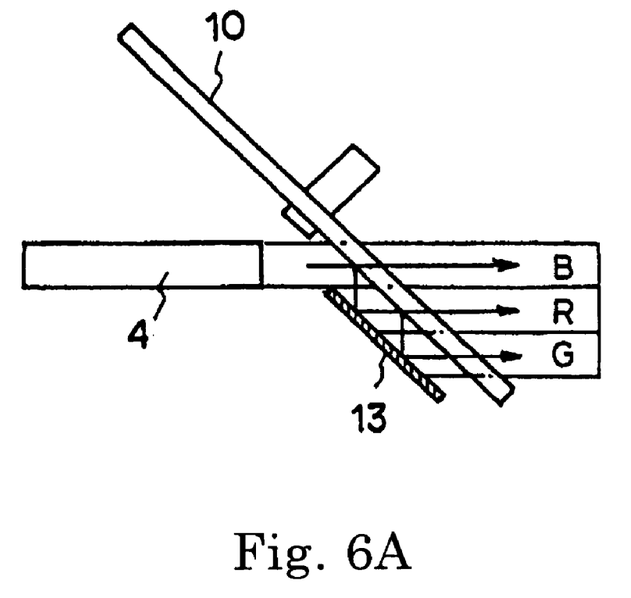
Figure 6B:
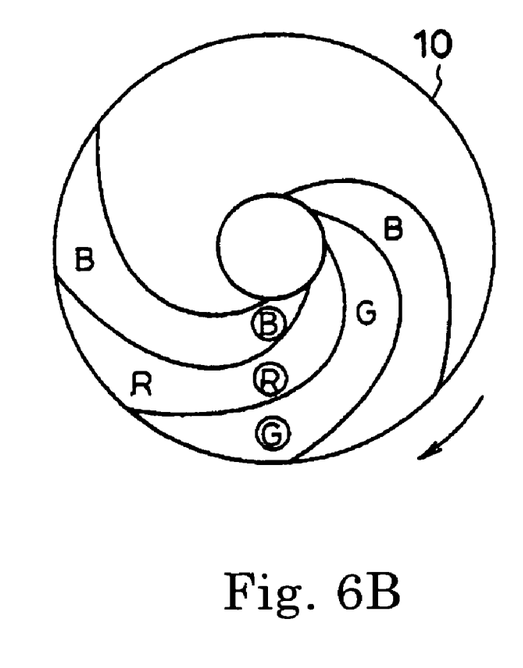
Figure 7A:
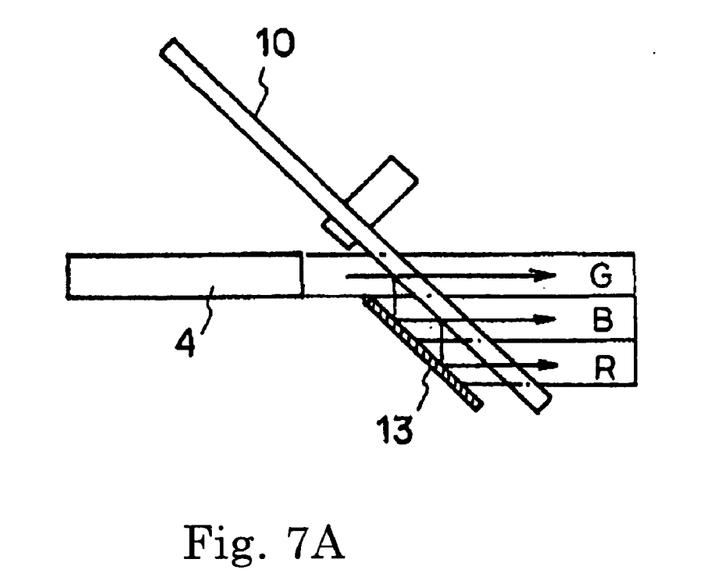
Figure 7B:
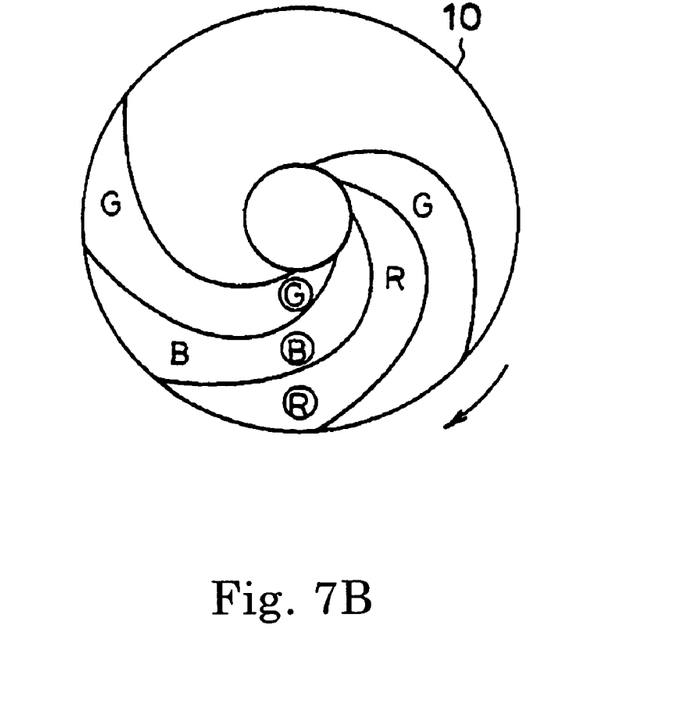

Description will now be made on the action of color decomposition in color wheel 10 in the first embodiment. FIGS. 5A to 7B are diagrams for describing the action of color decomposition, wherein FIGS. 5A, 6A, 7A are lateral views of color wheel 10 taken at a location near color wheel 10, while FIGS. 5B, 6B, 7B are lateral views of a portion of color wheel 10 corresponding to reflecting mirror 13, taken from the opposite side of color wheel 10 from light source 1. In FIGS. 5A, 5B, white light from light source 1, uniformalized by integrator rod 4, is emitted from the emission end face of integrator rod 4, and is irradiated to color wheel 10. Here, an R-component of the white light is transmitted by the R-filters, whereas a B-component and a G-component are reflected by the R-filters. Since color wheel 10 is oriented at 45 degrees to the optical axis of integrator rod 4, the B-component and G-component, reflected by reflecting mirror 13, are again directed in parallel with the optical axis, and therefore impinge on color wheel 10. Then, at this time, the G-component is transmitted by the G filters, whereas the B-component is reflected by the G filters. The reflected B-component is reflected by reflecting mirror 13, impinges on color wheel 10 again, and is transmitted by the B filters. The remaining wavelength components reflected even by the B filters are small enough to be ignored. In this way, respective color components of light flux are transmitted in the order of R, G, B by color wheel 10 from the inner peripheral side to the outer peripheral side of color wheel 10, so that all the white light from light source 1 is spectrally transmitted by color wheel 10.

After a predetermined time from the state illustrated in FIGS. 5A, 5B, the RGB filters change to the state illustrated in FIGS. 6A, 6B by rotation of color wheel 10 over a small angle. In a manner similar to that described in connection with FIGS. 5A, 5B, the respective color components of light flux are transmitted by color wheel 10 in the order or B, R, G from the inner periphery to the outer periphery of color wheel 10. Further, after a predetermined time, the RGB filters on color wheel 10 change to the state illustrated in FIGS. 7A, 7B, where the respective color components of light flux are transmitted by color wheel 10 in the order of G, B, R from the inner periphery to the outer periphery of color wheel 10.

Figure 8A:
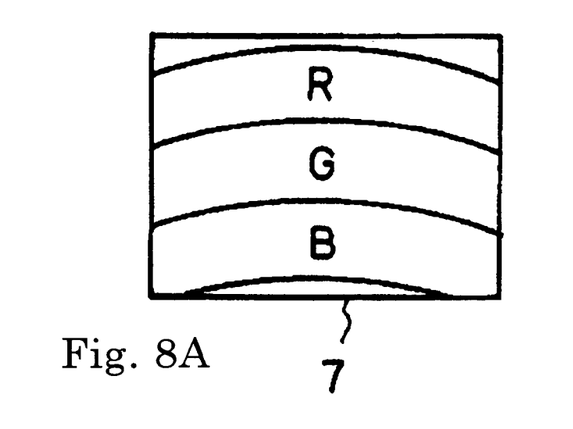
FIGS. 8A to 8C are explanatory diagrams each illustrating how an image is displayed on a DMD.
Figure 8B:
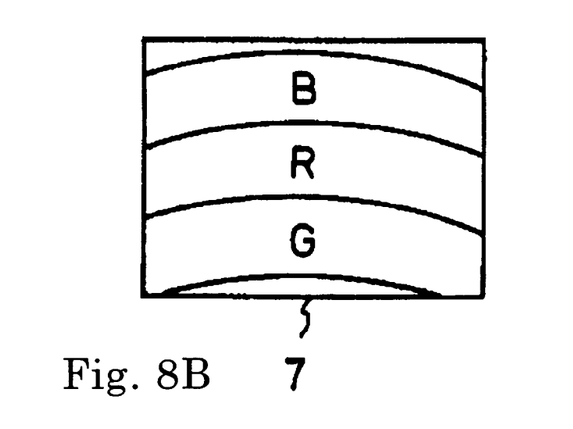
Figure 8C:
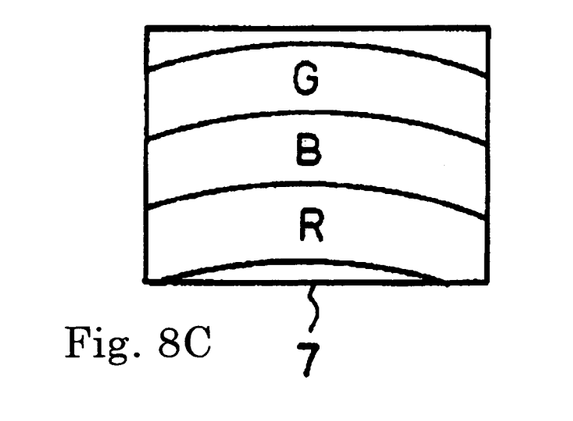

As a result, at each timing of FIGS. 5A to 7A, the R, G, B components of colored light are irradiated to three divided beltlike areas of DMD 7 (hereinafter called the "divided areas"), as illustrated in FIGS. 8A to 8C, respectively. In DMD 7, the respective divided areas are driven by a control circuit corresponding to the respective R, G, B beltlike colors to perform a modulating operation corresponding to each color. In this way, the R, G, B bands on DMD 7 change places with one another in sequence. Then, each of R, G, B colored light components, resulting from the modulation of part of an image, is reflected from each divided area, and projected onto a screen, not shown. Moreover, since colored light from each divided area changes from R to G and to B in sequence over time, a desired color image can be projected in one periodic unit of time division.

Though detailed illustration is omitted, reflecting mirror 13 is created by depositing a silver film on a glass substrate. Since the light intensity becomes lower each time the light is reflected by reflecting mirror 13 in accordance with the number of times of reflections, even the same colored light may differ in luminance on DMD 7. While the silver film may be replaced, for example, by an aluminum film to provide similar effects to those of the silver film, the reflectivity of the aluminum film lower than that of the silver film causes a large change in luminance on DMD 7. For this problem, it is effective to display colored light for a longer time as the colored light is reflected by a reflector a larger number of times after the color separation. Alternatively, the total reflection on the back surface of the glass substrate may be utilized instead of the silver film in consideration of the refractive index, thickness, and the like of the glass substrate, in which case the foregoing problem associated with the number of times of reflections is eliminated since the reflectivity is 100%.

Figure 9:
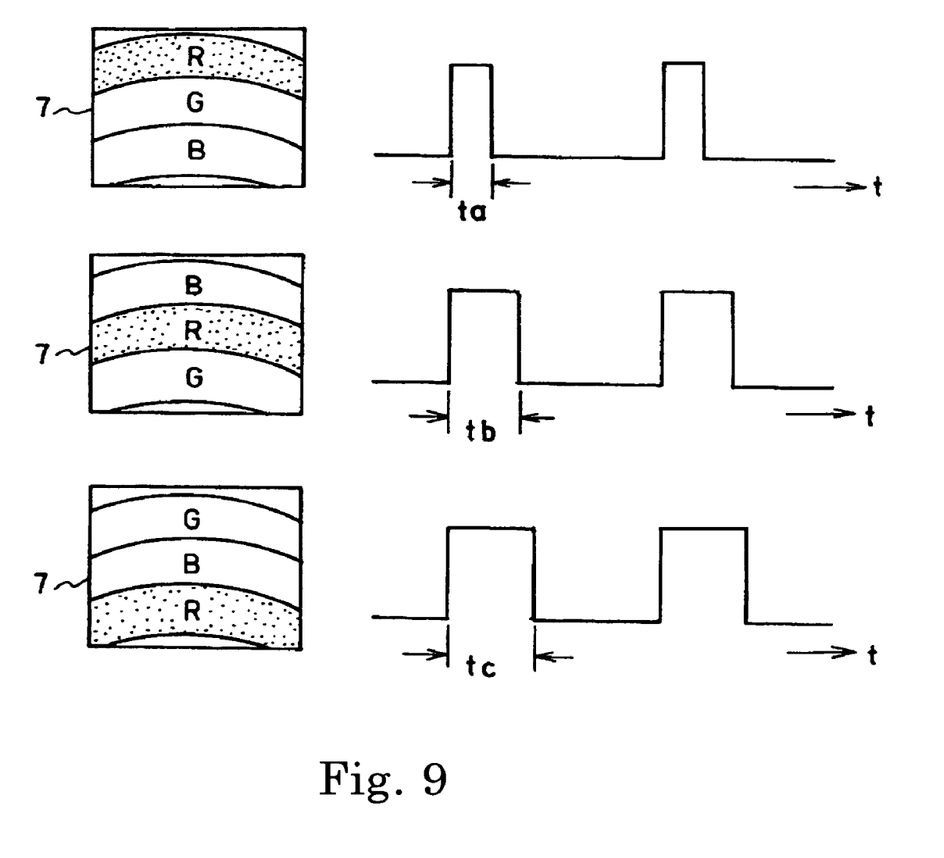
FIG. 9 is an explanatory diagram illustrating an exemplary method of controlling the DMD.

As an example, referring to FIG. 9, description will be made on the difference in ON time (projection time) of the miniature mirrors on DMD 7 for reflecting R-light in each of the color bands on DMD 7 when red light is projected over the entire screen. In the three left-hand figures, the uppermost figure indicates an area on which R-light impinges without reflection by reflecting mirror 13, and the middle and lowermost figures indicate an area on which R-light is incident with reflection made once or twice on reflecting mirror 13. As described above, since reflecting mirror 13 generally has a reflectivity less than 100%, the brightness of colored light irradiated to DMD 7 becomes lower as the colored light is reflected by reflecting mirror 13 a larger number of times. For this reason, assuming that each of miniature mirrors on DMD 7 are given the same ON time, when red light is projected over the entire screen, a lower portion of the image projected onto the screen is darker than an upper portion of the image, when an R-band is present at the positions shown in the middle and lowermost figures, resulting in uneven luminance. Since the degree of this uneven luminance is proportional to the number of times of reflections on the reflecting mirror 13, On-times ta, tb, tc given to the miniature mirrors on DMD 7 are made longer for colored light which is reflected by reflecting mirror 13 a larger number of times, as illustrated in the respective right-hand waveform charts of FIG. 9, to incrementally correct the luminance of colored light which is reflected a larger number of times, thereby making it possible to uniformalize the luminance over the whole screen to correct the screen for uneven luminance.

Relay lens 5 serves to efficiently guide light, which has passed through color wheel 10, to DMD 7. An area of color wheel 10 which is irradiated with light from integrator rod 4 is set to exist within the focus depth of relay lens 5. With such setting, since the image of color bands on color wheel 10 uniformly focuses over the entire surface of DMD 7, the boundaries of the respective color bands will not blur on DMD 7, and the miniature mirrors making up DMD 7 can be effectively utilized to improve the luminance on the projection screen.

Figure 10:
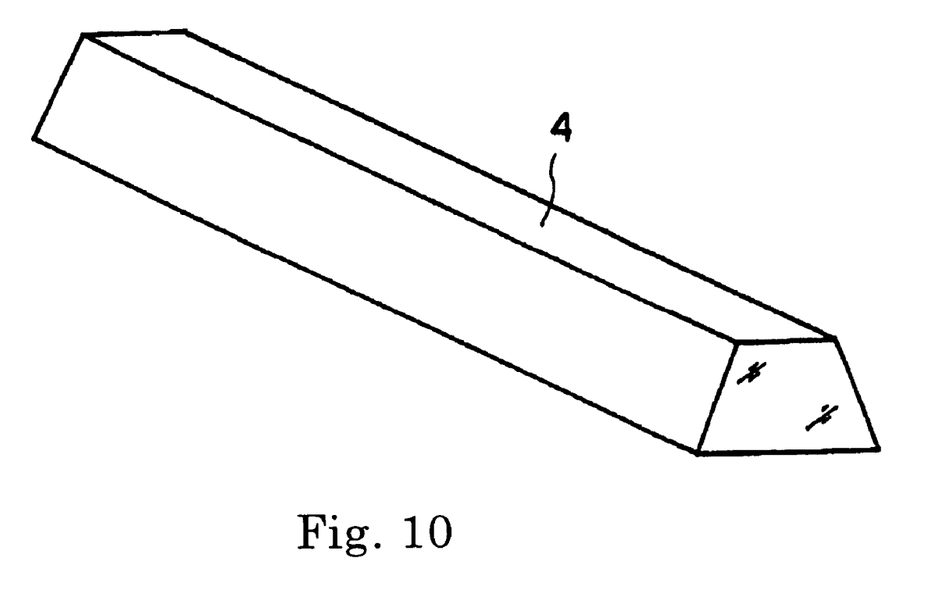
FIG. 10 is a perspective view illustrating an exemplary modification to an integrator rod.

Further, in regard to the shape of illumination light focused on DMD 7, since color wheel 10 is inclined with respect to the optical axis of integrator rod 4, the distance between relay lens 5 and color wheel 10 differs by inclination depending on the location. Specifically, the distance is longer in an area closer to the inner periphery than an area closer to the outer periphery, and light flux on the inner peripheral side is larger than on the outer peripheral side. Such a state means that illumination light is not efficiently irradiated onto DMD 7. To correct this inefficient illumination, integrator rod 4 is made to have a trapezoidal cross-sectional shape, as illustrated in FIG. 10, so that one side of the rod integrator on the inner periphery side, closer to color wheel 10, is made longer than the opposite side on the outer peripheral side, thereby making it possible to increase the width of light flux on the outer periphery side to achieve the uniformalization with the inner peripheral side.

As described above, in the projector of the first embodiment, reflected light provided when one light component is transmitted by one color filter of color wheel 10 is reflected by reflecting mirror 13, another light component is transmitted by another filter, and reflected light in this event is further reflected again by reflecting mirror 13 and is transmitted by another filter, thereby separating substantially all white light into R, G, B colored light components. Therefore, the projector requires only one reflecting mirror and only one DMD as an image display device, so that the projector can be simplified in structure as compared with Japanese Patent Laid-Open Publication No. 228535/2001 and Japanese Patent Laid-Open Publication No. 264953/99, and can improve the light utilization efficiency as compared with Japanese Patent Laid-Open Publication No. 264689/2001. Particularly, when reflecting mirror 13 has a reflectivity of 100%, it is possible to increase the light utilization ratio to substantially 100%. For this reason, the projector of the first embodiment can realize the light utilization efficiency three times as high as the FSC system and twice as high as the SCR system.

Figure 11:
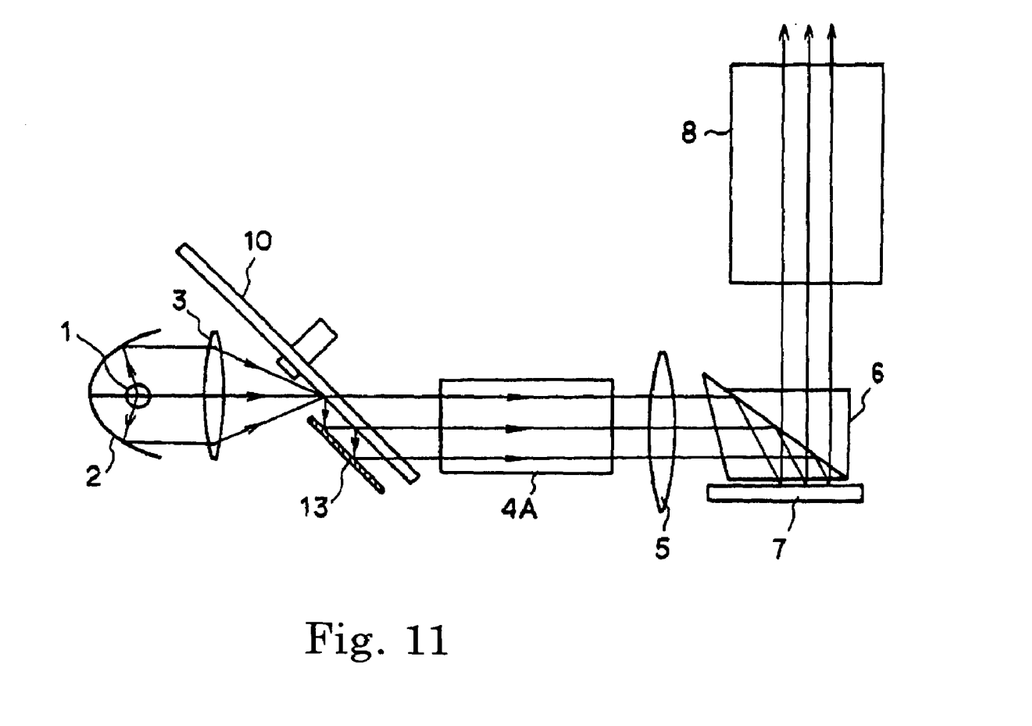
FIG. 11 is a schematic diagram illustrating the configuration of a color projection type display apparatus according to a second embodiment of the present invention.

FIG. 11 is a schematic diagram illustrating the configuration of a projector according to a second embodiment. Parts equivalent to those in the first embodiment are designated the same reference numerals, and repetitive description is omitted. The second embodiment differs from the first embodiment in that color wheel 10 changes places with integrator rod 4 along the optical axis. After white light from light source 1 is reflected by reflecting mirror 2, the reflected light is converged by condenser lens 3, and impinges on color wheel 10. Like the first embodiment, the incident white light is decomposed into R, G, B colored light components by the RGB filters of color wheel 10 and reflecting mirror 13. Each of R, G, B colored light components decomposed and transformed into beltlike light flux by color wheel 10 impinges on integrator rod 4A having large cross-sectional dimensions, and is uniformalized in the integrator rod 4A so as not to destroy the beltlike light flux, emitted from the emission end face of integrator rod 4A, and irradiated to DMD 7 through relay lens 5 and TIR prism 6.

Associated with the rotating operation of color wheel 10, three beltlike divided areas of DMD 7, as illustrated in FIGS. 8A to 8C, are sequentially irradiated with R, G, B colored light components. Then, image light reflected and modulated by the DMD 7 passes through TIR prism 6, and projected onto a screen, not shown, by projection lens 8 to display a color image.

In the second embodiment, each of decomposed R, G, B colored light components, after uniformalized in integrator rod 4A, is emitted from integrator rod 4A and transformed into collimated light flux by relay lens 5, thereby eliminating variations in irradiation characteristics to DMD 7 due to the difference in the distance between color wheel 10 and relay lens 5. It is therefore not necessary to form the cross-sectional shape of integrator rod 4A into a special shape such as trapezoid, as illustrated in FIG. 10.

Figure 12:
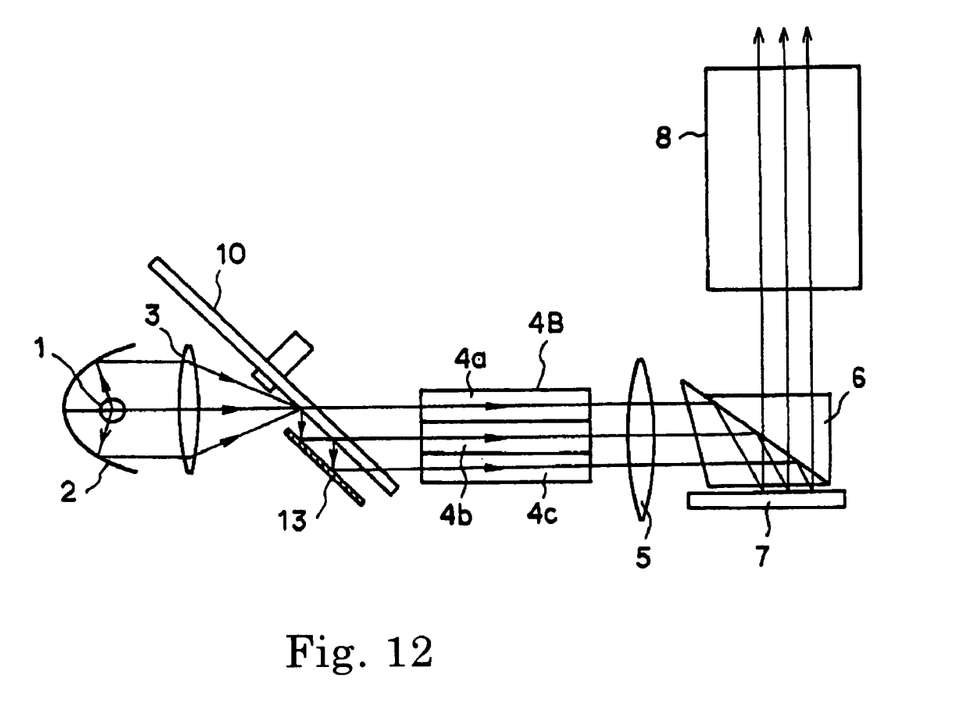
FIG. 12 is a schematic diagram illustrating the configuration of a color projection type display apparatus according to a third embodiment of the present invention.

FIG. 12 is a schematic diagram illustrating a projector according to a third embodiment of the present invention. Parts equivalent to those in the second embodiment are designated the same reference numerals, and repetitive description thereon is omitted. Like the second embodiment, white light from light source 1, after reflected by reflecting mirror 2, is converged by condenser lens 3, impinges on color wheel 10, and is decomposed into R, G, B colored light components. The third embodiment is identical to the first and second embodiment in that the incident white light is decomposed into R, G, B colored light components by the RGB filters of color wheel 10 and reflecting mirror 13. Each of R, G, B beltlike colored light components emitted from color wheel 10 is directed into integrator rod 4B which is divided into three areas for the respective colors, and is uniformalized on a color-by-color basis. Three-divided integrator rod 4B may be created by sectioning a single integrator rod into three beltlike areas 4a, 4b, 4c of integrator rod in the lengthwise direction or by integrating three separate integrator rods into one. Each of R, G, B colored light components emitted from three-divided integrator rod 4B impinges on DMD 7 through relay lens 5 and TIR prism 6 to form a display image on DMD 7, in a manner similar to the first and second embodiments. Then, the display image is projected onto a screen, not shown, by projection lens 8.

In the third embodiment, since the R, G, B colored light components separated in color wheel 10 are uniformalized by respective integrator rods 4a, 4b, 4c independent of each other, the respective colored light components will not be mixed with one another. Thus, the third embodiment is advantageous in displaying an image which excels in color separation.

Figure 13:
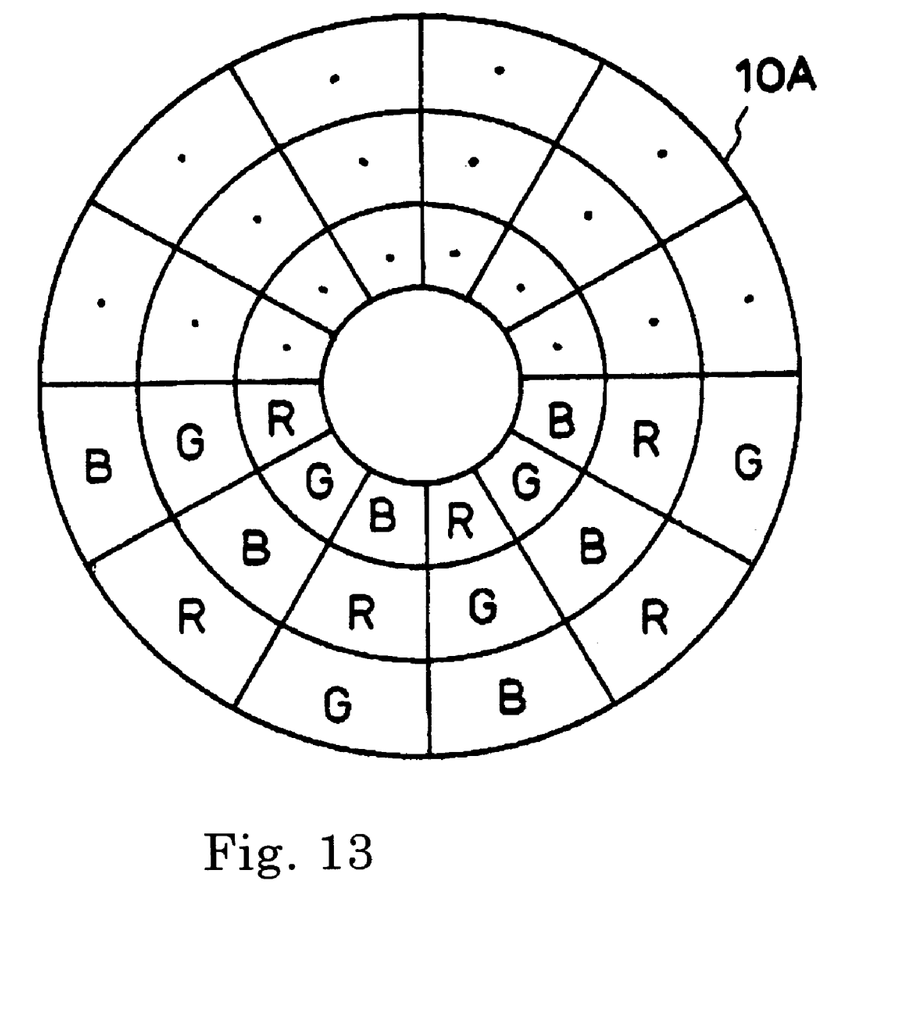
FIG. 13 is a lateral view illustrating an exemplary modification to the color wheel.

In the present invention, since the color wheel is only required to sequentially change the radial position of each of the R, G, B filters in association with the rotation of the color wheel, the color wheel may be designed to sequentially change the order in which concentrically laid-out R, G, B filters are arranged along the circumferential direction, as color wheel 10A illustrated in FIG. 13. Further, the color wheel is not limited to that composed of three filters for R, G, B, but may be composed of four color filters including W (white), or may be composed of six color filters including complementary colors C (cyan), M (magenta), Y (yellow).

The image display device in the present invention is not limited to the DMD employed in the respective embodiments described above, but the present invention may employ a transmission type or a reflection type liquid crystal display panel. Also, the light uniformalizing means is not limited to the integrator rod in the foregoing embodiments, but the present invention may utilize a light tunnel, a rod lens, an integrator, a fly-eye lens, and the like.

Although a certain preferred embodiments of the present invention have been shown and described in detail, it should be understood that various changes and modifications may be made without departing from the spirit or scope of the appended claims.

What is claimed is:

1. A color projection type display apparatus comprising:
   a light source;
   a color wheel driven to rotate, and having a plurality of types of color filters disposed on a surface thereof, said color filters being different in characteristics from one another to transmit a particular component of light from said light source and to reflect the remaining components;
   a reflector for reflecting a component of light impinging on said color wheel and reflected by one type of said color filters to again direct the component back to another type of said color filters;
   an image display device having a plurality of areas each irradiated with said particular component of light transmitted by said color filters, respectively, to display an image;
   a projection lens for projecting the image displayed by said image display device onto a screen; and
   a color wheel case for housing said color wheel and supporting the same inside thereof, said reflector being mounted to said color wheel case.

2. The color projection type display apparatus according to claim 1, wherein said each filter of said color wheel is oriented at an angle of 45 degrees to an optical axis of light incident thereon, and said reflector is disposed in parallel with said color wheel on a light incident side with a reflecting surface of said reflector being spaced apart from said color wheel by a predetermined distance.

3. The color projection type display apparatus according to claim 1, further comprising light uniformalizing means disposed between said light source and said color wheel for uniformalizing light impinging thereon and emitting the uniformalized light.

4. The color projection type display apparatus according to claim 1, further comprising light uniformalizing means disposed between said color wheel and said image display device for uniformalizing light impinging thereon and emitting the uniformalized light.

5. The color projection type display apparatus according to claim 4, wherein said light uniformalizing means is divided to uniformalize a plurality of colored light components separated by said color wheel independently of one another.

6. The color projection type display apparatus according to claim 1, wherein said color wheel comprises a first to an N-th (N is a natural number) filter, wherein:
   part of incident light is transmitted by the first filter to provide first transmitted light, while the remaining light is reflected by the first filter to provide first reflected light, said first reflected light impinges on the second filter after reflected by said reflector, part of the first reflected light is transmitted by the second filter to provide second transmitted light, while the rest of the first reflected light is reflected by the second filter to provide second reflected light, the second reflected light impinges on the third filter after reflected by said reflector, and part of the second reflected light is transmitted by the third filter to provide third transmitted light,
   a sequence of the reflection and transmission process is repeated a number of times equal to the number of filters N to provide first to N-th transmitted light, and
   said color wheel irradiates said image display device with the first to N-th transmitted light.

7. The color projection type display apparatus according to claim 3, further comprising an optical element for irradiating said image display device with a plurality of separated light components emitted from said color wheel, wherein areas of said filters irradiated with the light from said light uniformalizing means are within a focus depth of a back focus of said optical element.

8. The color projection type display apparatus according to claim 3, wherein said light uniformalizing means includes a light tunnel, and one side of said light uniformalizing means closer to said color wheel has a length longer than that of an opposite side thereof.

9. The color projection type display apparatus according to claim 3, wherein said light uniformalizing means includes a rod lens, and one side of said light uniformalizing means closer to said color wheel has a length longer than that of an opposite side thereof.

10. The color projection type display apparatus according to claim 1, wherein a display image area irradiated with a colored light component which is reflected by said reflector a larger number of times displays the colored light components for a longer time.

* * * * *